UNITED STATES PATENT OFFICE.

LOUIS KLEINBROD, (NAMED KLEIN,) OF STRASSBURG, GERMANY.

PROCESS OF TREATING CAROB.

1,150,607.  Specification of Letters Patent.  Patented Aug. 17, 1915.

No Drawing.   Application filed October 26, 1914.   Serial No. 868,782.

*To all whom it may concern:*

Be it known that I, LOUIS KLEINBROD, (named KLEIN,) a subject of the Emperor of Germany, and residing at Strassburg, in Alsace-Lorraine, Germany, have invented certain new and useful Improvements in Processes of Treating Carob, of which the following is a specification, reference being had therein to the accompanying drawing.

My invention relates to a process of treating carob. The raw material is carob (*Fructus Ceratoniæ*) which cannot be used as a nourishment without being treated in a special process owing to its abundance of butyric-acid and other ill smelling substances. The carob is treated for a short time with steam under pressure and under continued movement. This will be done in a rotary autoclave. Thereby the butyric-acid and the other disagreeable admixtures and the greater part of the sugar will be removed. The removal of the sugar is necessary to prevent the product from becoming pasty. The carob is only cut into pieces because the pulverizing in raw state is very difficult and only possible after long drying. The carob is dried after the treatment with steam in a drying apparatus and then moderately roasted at a low temperature. Then the carob is finely pulverized, sifted and mixed with materials which act as modifiers of the taste, such as chestnuts (*Castanea vesca*) for example. The chestnuts will be first peeled, then dried and moderately roasted and then pulverized.

The mixing of the materials will be in practice in the following proportions: 85% carob, 5% chestnuts, 5% potato-flour, 2% slime-matters such as saloop, 2% fat-matters such as vegetable fat, $\frac{1}{2}$% gum such as Arabic-gum, $\frac{1}{2}$% aromatic-matters such as vanilla. The whole is intimately mixed and can then be used as powder for cooking purposes or after being pressed into small plates or into any other form.

Having thus described my invention and in what manner the same is to be performed I declare that what I claim is:

1. Process of treating carob consisting in treating the carob with steam under pressure and under constant agitation, and mixing it with mealy, slimy, fatty, gummy, and aromatic substances, substantially as described.

2. Process of treating carob consisting in treating the carob with steam under pressure under constant agitation and mixing it with chestnuts, potato flour, saloop, vegetable fat, Arabic gum and vanilla, substantially as described.

3. Process of treating carob consisting of treating the carob with steam under pressure and under constant agitation and mixing 85% carob with 5% chestnuts, 5% potato flour, 2% slime, 2% fats, $\frac{1}{2}$% Arabic gum and $\frac{1}{2}$% aromatic substances, substantially as described.

In testimony whereof I affix my signature in presence of two witnesses.

LOUIS KLEINBROD, GEN. KLEIN.

Witnesses:
FANNY R. JEWETT,
J. C. MCNALLY.

Copies of this patent may be obtained for five cents each, by addressing the "Commissioner of Patents, Washington, D. C."